United States Patent
Lang

(10) Patent No.: US 7,085,367 B1
(45) Date of Patent: Aug. 1, 2006

(54) CALL DURATION ALERT

(75) Inventor: Daryl U. Lang, Aurora, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 123 days.

(21) Appl. No.: 10/786,221

(22) Filed: Feb. 24, 2004

(51) Int. Cl.
*H04M 3/00* (2006.01)

(52) U.S. Cl. .............................. 379/265.06; 379/265.03

(58) Field of Classification Search ..................... None
See application file for complete search history.

(56) References Cited

U.S. PATENT DOCUMENTS

| | | | |
|---|---|---|---|
| 5,155,761 A | 10/1992 | Hammond | 379/67 |
| 5,206,903 A | 4/1993 | Kohler et al. | 379/309 |
| 5,214,688 A * | 5/1993 | Szlam et al. | 379/266.08 |
| 5,506,898 A | 4/1996 | Costantini et al. | 379/266 |
| 5,592,378 A | 1/1997 | Cameron et al. | 395/227 |
| 5,594,726 A | 1/1997 | Thompson et al. | 370/485 |
| 5,606,361 A | 2/1997 | Davidsohn et al. | 348/14 |
| 5,627,884 A | 5/1997 | Williams et al. | 379/67 |
| 5,684,872 A | 11/1997 | Flockhart et al. | 379/266 |
| 5,721,770 A * | 2/1998 | Kohler | 379/265.12 |
| 5,724,092 A | 3/1998 | Davidsohn et al. | 348/14 |
| 5,740,238 A | 4/1998 | Flockhart et al. | 379/221 |
| 5,751,707 A | 5/1998 | Voit et al. | 370/384 |
| 5,754,639 A | 5/1998 | Flockhart et al. | 379/221 |
| 5,790,677 A | 8/1998 | Fox et al. | 380/24 |
| 5,828,747 A | 10/1998 | Fisher et al. | 379/309 |
| 5,839,117 A | 11/1998 | Cameron et al. | 705/27 |
| 5,875,437 A | 2/1999 | Atkins | 705/40 |
| 5,880,720 A | 3/1999 | Iwafune et al. | 345/327 |
| 5,884,032 A | 3/1999 | Bateman et al. | 395/200.34 |
| 5,897,622 A | 4/1999 | Blinn et al. | 705/26 |
| 5,903,877 A | 5/1999 | Berkowitz et al. | 705/26 |
| 5,905,793 A | 5/1999 | Flockhart et al. | 379/266 |
| 5,982,873 A | 11/1999 | Flockhart et al. | 379/266 |
| 6,000,832 A | 12/1999 | Franklin et al. | 364/479.02 |
| 6,044,205 A | 3/2000 | Reed et al. | 395/200.31 |
| 6,049,547 A | 4/2000 | Fisher et al. | 370/412 |
| 6,064,730 A | 5/2000 | Ginsberg | 379/265 |
| 6,064,731 A | 5/2000 | Flockhart et al. | 379/265 |
| 6,088,441 A | 7/2000 | Flockhart et al. | 379/265 |
| 6,163,607 A | 12/2000 | Bogart et al. | 379/266 |
| 6,173,053 B1 | 1/2001 | Bogart et al. | 379/266 |
| 6,192,122 B1 | 2/2001 | Flockhart et al. | 379/266 |

(Continued)

FOREIGN PATENT DOCUMENTS

EP 0 829 996 A2 3/1998

(Continued)

OTHER PUBLICATIONS

U.S. Appl. No. 09/669,486, filed Sep. 25, 2000, Flockhart et al.

(Continued)

*Primary Examiner*—Creighton Smith
(74) *Attorney, Agent, or Firm*—Sheridan Ross P.C.

(57) ABSTRACT

A contact center for servicing a contact is provided that includes (a) an input operable to receive a contact from a customer; (b) a selection function 26 operable to direct the contact to a human agent associated with the contact center for servicing; and (c) a contact monitor 62 operable (a) to track a service time required by the human agent to service the contact and (b), when the service time at least one of equals and exceeds a selected first threshold, notify the agent that the selected first threshold has been at least one of equaled and exceeded.

25 Claims, 2 Drawing Sheets

U.S. PATENT DOCUMENTS

| | | | |
|---|---|---|---|
| 6,295,353 B1 | 9/2001 | Flockhart et al. | 379/265 |
| 6,366,668 B1 | 4/2002 | Borst et al. | 379/266.04 |
| 6,389,028 B1 | 5/2002 | Bondarenko et al. | 370/401 |
| 6,430,282 B1 | 8/2002 | Bannister et al. | 379/211.02 |
| 6,449,356 B1 | 9/2002 | Dezonno | 379/265.01 |
| 6,453,038 B1 | 9/2002 | McFarlane et al. | 379/265.05 |
| 6,463,346 B1 | 10/2002 | Flockhart et al. | 700/102 |
| 6,535,600 B1 | 3/2003 | Fisher et al. | 379/265.12 |
| 6,597,685 B1 | 7/2003 | Miloslavsky et al. | 370/352 |
| 6,937,702 B1 * | 8/2005 | Vacek et al. | 379/88.02 |
| 6,944,129 B1 * | 9/2005 | Duncan | 370/236 |
| 2002/0118816 A1 | 8/2002 | Flockhart et al. | 379/265.12 |
| 2002/0181692 A1 | 12/2002 | Flockhart et al. | 379/265.02 |
| 2004/0193475 A1 * | 9/2004 | Hemm et al. | 705/9 |
| 2005/0047556 A1 * | 3/2005 | Somerville et al. | 379/9.01 |
| 2005/0182672 A1 * | 8/2005 | Hemm et al. | 705/9 |

FOREIGN PATENT DOCUMENTS

| | | |
|---|---|---|
| EP | 0 866 407 A1 | 9/1998 |
| WO | WO 97/28635 | 8/1997 |

OTHER PUBLICATIONS

Doo-Hyun Kim et al. "Collaborative Multimedia Middleware Architecture and Advanced Internet Call Center"; ProceedingsInternational Conference on Information Networking (Jan. 31, 2001), pp. 246-250.

No Author, "When Talk Isn't Cheap" Sm@rt Reseller, vol. 3, No. 13, (Apr. 3, 2000), p. 50.

No Auther, "eGain's Commerce 2000 Platform Sets New Standard for eCommerce Customer Communications" Business Wire (Nov. 15, 1999).

* cited by examiner

CALL DURATION ALERT

FIELD OF THE INVENTION

The present invention relates generally to techniques for servicing contacts in customer contact centers and specifically to techniques for monitoring a duration of servicing of a customer contact.

BACKGROUND OF THE INVENTION

In customer contact systems or use centers, calls incoming to a call center are answered and handled by a plurality of agents. The system automatically distributes and connects incoming calls to whatever agents are suited to handle the calls and are free, i.e., not handling other calls at the moment. As used herein, a "call" or "contact" refers to any mode or type of contact between two entities, including without limitation voice calls, VoIP, text-chat, e-mail, instant messages, fax, electronic documents, webforms, voice messages, and video calls, to name but a few.

A system frequently becomes overloaded when no suitable agents are available to handle calls when the calls come in. The calls are placed in different queues based upon some pre-established criteria and are placed in each queue in the order of their arrival and/or priority. When a call center is overloaded, it is desirable, for purposes of customer satisfaction, to service the enqueued contacts as quickly as possible to minimize the wait time for enqueued calls waiting to be serviced. Many call centers have predetermined goals setting forth the desired maximum time in which to service a call.

To implement call center service goals, agent performance is typically monitored historically and in real time by call center administrators and supervisors. Statistic servers or stat-servers typically collect historical information regarding call center performance and goal compliance. Additionally, supervisors monitor in real-time the servicing of calls by agents. The supervisor typically is notified visually or audibly of the duration of servicing of a call by a specific agent when the duration exceeds a determined period. When the supervisor is notified, the supervisor can query the agent to determine if he or she requires help to wrap-up the call.

Because agents are commonly evaluated based, at least in part, on the average time required by the agent to service calls during a selected evaluation period, it is desirable for the agents to be made aware of this criterion before a supervisor evaluation so that the agent may address any performance deficiency and provide better service to customers.

SUMMARY OF THE INVENTION

These and other problems are addressed by the present invention. The present invention is directed generally to an architecture for tracking the duration of the time required by an agent to service real-time and/or non-real-time contacts and continuously or periodically notifying the agent of the tracked duration. As used herein, real-time contacts refer to contacts in which the contacting entity or customer is present during the waiting (or queuing) period and can choose to abandon or disconnect the contact if the call is not serviced within an acceptable period. Common examples include voice calls, VoIP, text-chat, instant messages, video calls, and the like. Non-real-time contacts refer to contacts in which the contacting entity or customer is unable to abandon or disconnect the contact. Common examples include e-mail, fax, electronic or paper documents, webform submissions, voice messages, and the like.

In one embodiment, a method is provided for servicing a contact that includes the steps of:

(a) receiving, in a contact center, a contact from a customer;

(b) directing the contact to a human agent associated with the contact center for servicing;

(c) tracking a service time required by the human agent to service the contact; and (d) notifying the agent of the tracked service time.

The method provides direct notification to the agent of their compliance with contact center service goals while the agent is servicing the current contact. The method can therefore provide higher levels of agent performance, compliance with contact center goals, and customer satisfaction.

In one configuration, the agent is notified of the tracked service time, when the service time equals and/or exceeds a selected first threshold. In this configuration, the agent is generally only periodically notified of the service time to avoid unnecessarily distracting the agent while servicing a contact. The agent is typically notified that the selected first threshold has been equaled and/or exceeded. The selected first threshold can be administered or agent configurable and is commonly associated with a customer service goal (or agent performance criterion) of the contact center.

A number of differing thresholds can be used depending on the application. The first threshold can be agent configured as a warning that a maximum desirable service time is approaching. The second threshold can be the maximum desirable service time.

The timer tracking the service time can be started upon the occurrence of a number of differing events. For example, the timer can be started when the contact is received by a communication device associated with the human agent (e.g., when the call is ringing on the agent's phone, when the email received notification is displayed on the agent's monitor, when an instant message pops up on the agent's monitor, etc.), when the contact is directed to the agent (e.g., when the call state changes, when the transfer request is sent, etc.), when the contact is answered by the human agent (e.g., an off-hook signal is received by the contact center from the agent's phone, an initial audible voice signal is detected on the communication path between the agent and customer, the agent opens up an email, etc.); and when the contact is displayed graphically on a computational component associated with the agent.

The notifying step can be performed in a number of different ways. For example, the agent notification can be performed by graphically displaying a message on a computational component associated with the agent; playing a zip tone in the agent's communication device; providing an audible voice warning on the agent's communication device; and illuminating a warning light visible to the agent.

The notification content can convey not only the time duration or service time of the current contact but also the implications of the duration and/or recommended actions to be performed by the agent. For example, the voice or text message in the notification can request the agent to wrap up the call, ask if the agent requires the assistance of another contact center resource, such as the agent's supervisor, in servicing the contact, inform the agent that the service goal of the contact center is not being complied with, etc.

The above-described embodiments and configurations are neither complete nor exhaustive. As will be appreciated,

DETAILED DESCRIPTION

Figure 1:
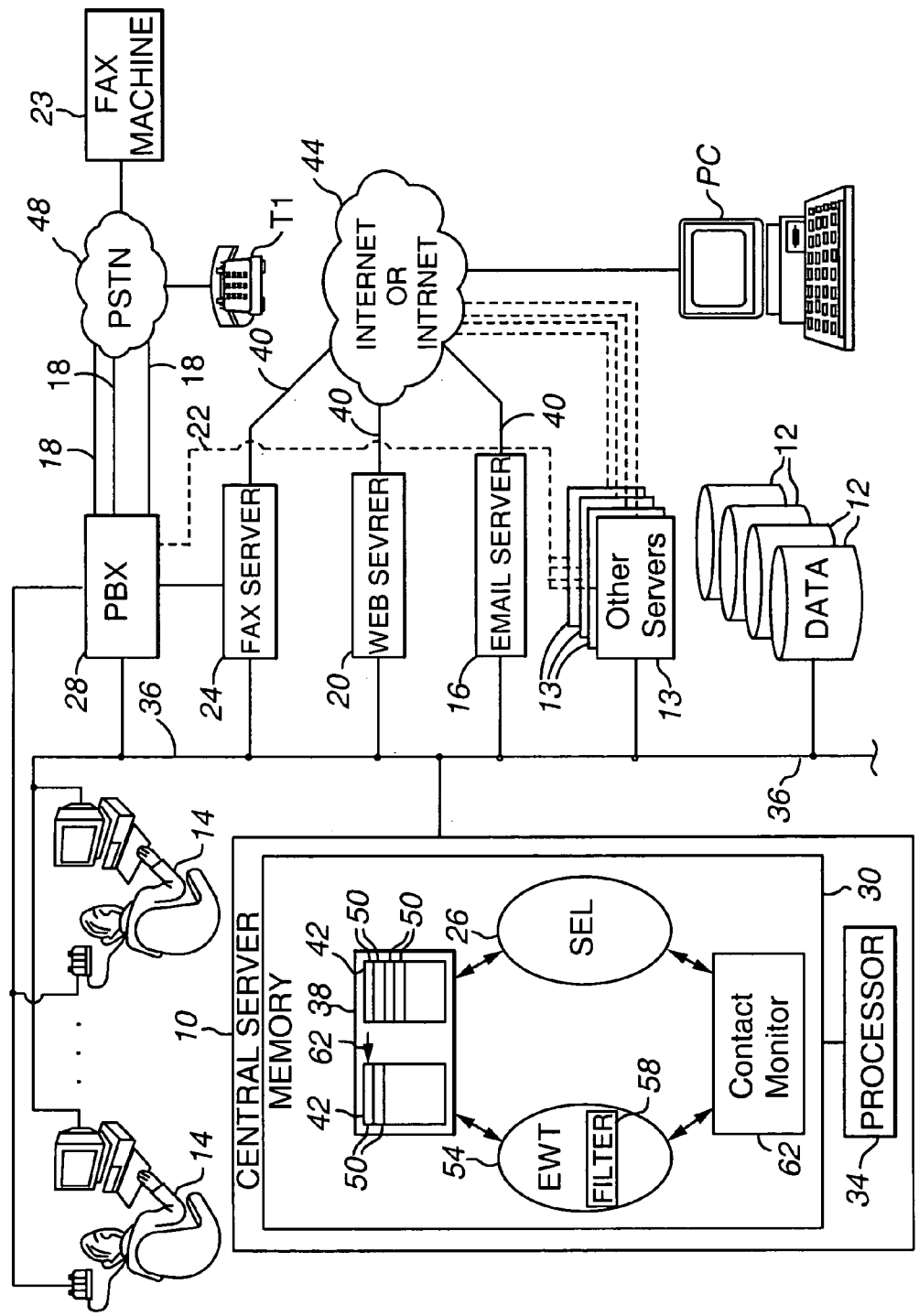
FIG. 1 is a block diagram of a contact center that includes an illustrative embodiment of the invention.

FIG. 1 shows an illustrative embodiment of the present invention. A contact center comprises a central server 10 (such as a modified version of the Definity™, MultiVantage™, Service Manager™, and CRM Central 2000 Server™ of Avaya, Inc.), a set of data stores or databases 12 containing contact or customer related information and other information that can enhance the value and efficiency of the contact, and a plurality of servers, namely a fax server 24, a web server 20, an email server 16, and other servers 13, a private branch exchange PBX 28 (or private automatic exchange PAX), a plurality of working agents 14 operating computer work stations, such as personal computers, and/or telephones or other type of voice communications equipment, all interconnected by a local area network LAN (or wide area network WAN) 36. The fax server 24, web server 20 and email server 16 are connected via communication connections 40 to an internet and/or intranet 44. The other servers 13 can be connected via optional communication lines 22, 32 to the PBX 28 and/or internet or intranet 44. As will appreciated, other servers 13 could include a scanner (which is normally not connected to the PBX 28 or internet or intranet 44), interactive voice recognition IVR software, VoIP software, video call software, voice messaging software, an IP voice server, and the like. The PBX 28 is connected via a plurality of trunks 18 to the public switch telecommunication network PSTN 48 and to the fax server 24 and telephones of the agents 14. As will be appreciated, faxes can be received via the PSTN 48 or via the internet or intranet 44 by means of a suitably equipped personal computer. The PBX 28, fax server 24, email server 16, web server 20, and database 12 are conventional.

In the architecture of FIG. 1 when the central server 10 forwards a voice contact to an agent, the central server 10 also forwards information from databases 12 to the agent's computer work station for viewing (such as by a pop-up display) to permit the agent to better serve the customer.

As will be appreciated, the central server 10 is notified via LAN 36 of an incoming real-time or non-real-time contact by the telecommunications component (e.g., PBX 28, fax server 24, email server 16, web server 20, and/or other server 13) receiving the incoming contact. The incoming contact is held by the receiving telecommunications component until the central server 10 forwards instructions to the component to forward the contact to a specific station or agent 14. The server 10 distributes and connects these contacts to stations 14 of available agents based on set of predetermined criteria. The agents 14 process the contacts sent to them by the central server 10.

The memory 30 includes a plurality of sets 38 of call queues 42 and 46. Each set 38 of call queues 42 and 46 conventionally serves and holds contacts for a different work type and/or for real-versus non-real-time contacts. In the depicted embodiment, queues 42 serve non-real-time contacts while queues 46 serve real-time contacts. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness. Within each set 38 of queues 42 and 46, each queue holds contacts of a different priority and/or different type (e.g., e-mail, fax, electronic or paper documents, webform submissions, voice messages, voice calls, VoIP calls, text chat, video calls, and the like). The priority of a contact is determined according to well known predefined criteria. Each queue 42 and 46 normally functions as a first-in, first-out (FIFO) buffer memory, and includes a plurality of entries, or positions 50, each for identifying a corresponding one enqueued contact. The position 50 at the head of the queue is considered to be position 1, the next subsequent position 50 to be position number 2, and so forth.

Memory 30 further includes an estimated wait time (EWT) function, (or waiting time predictor) 54. As its name implies, this function determines an estimate of how long a contact that is placed in a queue 42 or 46 will have to wait before being delivered to an agent 14 for servicing. The estimate is derived separately by EWT function 54 for each queue 42 or 46 of each set 38.

The memory 30 further includes a contact monitor 62 to monitor the statuses of the enqueued contacts and the servicing of the contacts by contact center resources. For each contact being serviced, the contact monitor 62 provides information regarding the duration of contact servicing not only to the supervisor but also to the agent servicing the contact.

The information can be provided in many ways. For example, the information can be provided by way of a pop-up on the agents computer, a "zip tone" on the agent's headset, a voice warning on the agent's headset, illumination of a warning light on the agent's telephone, and the like.

The information can be provided to the agent continuously or periodically. To avoid undue distraction of the agent during contact servicing, it is preferred that the information be provided periodically based on the service time or duration meeting or exceeding one or more selected thresholds. The thresholds may be agent configurable or preset by contact center administrators. The thresholds can be differing meanings. The first threshold, for example, can indicate to the agent that the agent's desired maximum service duration is being or is close to being exceeded. The second threshold can indicate to the agent that the contact center's desired maximum service duration (or service time goal) is being or is close to being exceeded. Additional thresholds may be set depending on the application. In another example, the various thresholds are measured relative to the maximum desired service or call duration. For example, a first threshold can be set at 10% of the duration; a second threshold at 50% of the duration; a third threshold at 100% of the duration; and a fourth threshold at 125% of the duration.

The thresholds can be used to provide periodic notifications to contact center supervisors/administrators. For example, when a threshold is being exceeded the supervisor of the agent can be notified by any of the techniques noted above. The supervisor can offer the agent assistance in servicing the contact or can offer to service the contact himself or herself. The supervisor can convey this to the agent by direct physical contact or conversation or by sending a suitable message, such as e-mail, chat message, an instant message, and the like.

The timer to measure the duration of the service of a contact can be started on any suitable event. For example, the timer can be started when the contact is transferred or routed to the agent, when the agent answers the transferred contact, when the contact is received by a communication device associated with the human agent, when the contact is displayed graphically on a computational component associated with the agent and the like. The agent himself or herself can self-start the timer.

Memory 30 can further include a contact-selection (SEL) function 26. Function 26 is conventional in that, for each contact at the head of a queue, it determines, for real-time a current or oldest wait time or CWT, the weighted average advance time WAT, the expected wait time EWT, and/or the predicted wait time PWT (which is the sum of the CWT and WAT), and, for each available agent, it selects a contact from queues 42 and/or 46 for connection to and handling by that agent. This feature is further described in U.S. Pat. No. 5,905,793, which is incorporated herein by this reference.

Figure 2:
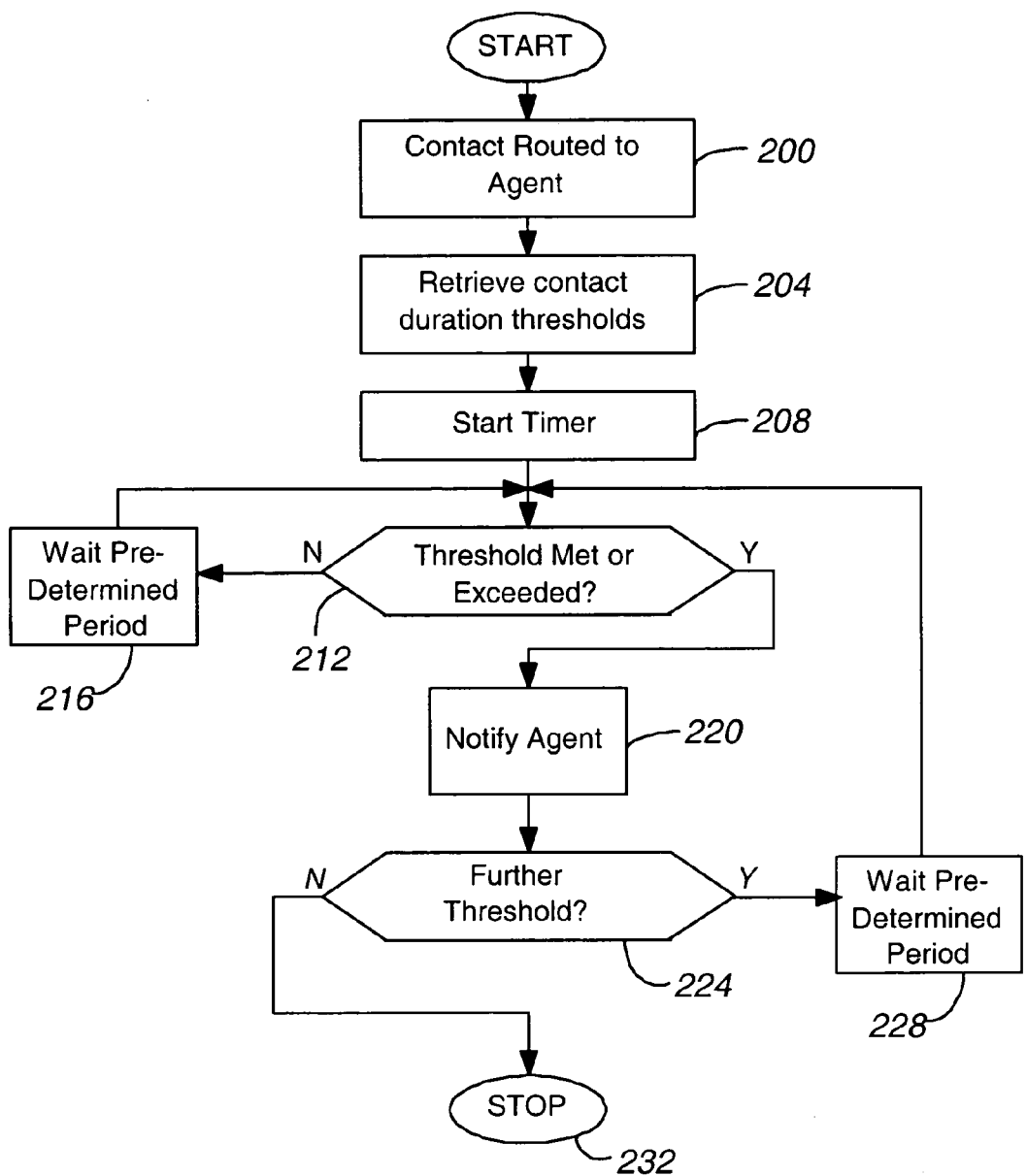
FIG. 2 is a flow diagram of the operation of the contact monitor according to an illustrative embodiment of the present invention.

The operation of the contact monitor 62 will now be described with reference to FIGS. 1 and 2. Referring to FIG. 2, the contact, in step 200 is routed directly upon receipt or from a queue 38 to the agent. In step 204, the monitor 62 retrieves the contact duration threshold(s) for the agent to whom the contact has been routed. As will be appreciated, differing agents can have differing sets of thresholds. Higher skilled agents (or differently skilled agents) may, for example, have different thresholds than lower skilled agents (or agents having other skills). The monitor 62 starts the timer in step 208.

In decision diamond 212, the monitor 62 determines if the first threshold has been met or exceeded. If the first threshold is not met or exceeded, the monitor 62 proceeds to step 216 and waits a first predetermined period before repeating the decision diamond 212. The first predetermined period is typically less than the first threshold. If the first threshold is met or exceeded, the monitor in step 220 notifies the agent that the first threshold has been met or exceeded.

In decision diamond 224, the monitor determines if there are further thresholds. If so, the monitor 62 proceeds to step 228, waits a second predetermined period and then repeats decision diamond 212 using the second threshold. If not, the monitor 62 terminates operation in step 232.

As will be appreciated, if at any time the contact terminates or is transferred from the agent to another agent, the agent's supervisor, or another contact center resource the monitor proceeds immediately to step 232 and terminates operation with respect to the agent no longer handling the contact.

A number of variations and modifications of the invention can be used. It would be possible to provide for some features of the invention without providing others.

For example in one alternative embodiment, each queue set 38 includes only one queue of items in which contacts having a different priority are enqueued in their order of priority.

In another alternative embodiment, the steps 200, 204, 208, 212, and 220 can be performed in a different order. For example, the timer can be started before, after or during step 200.

In yet another alternative embodiment, the monitor 62 can be embodied as a logic circuit, software, and/or a combination thereof.

In yet another alternative embodiment, the central server of FIG. 1 is replaced with the subscriber-premises equipment disclosed in U.S. Pat. Nos. 5,905,793; 5,506,898; and 5,206,903, all of which are incorporated herein by this reference. In the contact center of FIG. 1, automatic call distribution ACD logic, including the queues, EWT module, and work distributor are separated from the ACD switch and located in an external server.

In yet another embodiment, real- and/or non-real-time contacts enter the contact center via computational components other than those shown in FIG. 1. For example, such components can be other types of servers such as an IP voice server or other types of communications equipment such as an IP switch, a voice messaging system, and the like.

In yet another embodiment, the timer can be a count-up or count-down timer. In a count-up timer, the selected timing threshold is equaled (and/or exceeded) when the timer reaches (or surpasses) a time equal to the timing threshold (when the timer starts at zero) or reaches (or surpasses) a time equal to the sum of the start time and the threshold. In a count-down timer, the selected timing threshold is equaled (or exceeded) when the timer reaches zero (when the start time was the threshold) or reaches (or surpasses) a time equal to the start time less the threshold.

In yet another embodiment, the contact monitor 62 is not built into the switch/server but rather is in the agent's communication device/computational component itself. For example, the monitor can be in the agent's Personal Computer work station and/or in the agent's telephone.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for servicing a contact, comprising:
    (a) receiving, in a contact center, a contact from a customer;
    (b) directing the contact to a human agent associated with the contact center for servicing;
    (c) tracking a service time required by the human agent to service the contact; and
    (d) notifying the agent of the tracked service time
    (e) notifying the agent of the tracked service time, when the service time at least one of equals and exceeds a selected first threshold; and (f) notifying the agent and the agent's supervisor when the service time at least one of equals and exceeds a selected second threshold different from the selected first threshold.

2. The method of claim 1, wherein the agent is notified that the selected first threshold has been at least one of equaled and exceed.

3. The method of claim 1, wherein selected first threshold is associated with a customer service goal of the contact center.

4. The method of claim 1, wherein the tracking step comprises:
starting a timer when the contact is directed to the human agent.

5. The method of claim 1, wherein the tracking step comprises:
starting a timer when the contact is received by a communication device associated with the human agent.

6. The method of claim 1, wherein the contact is a non-real-time contact and wherein the tracking step comprises:
starting a timer when the contact is displayed graphically on a computational component associated with the agent.

7. The method of claim 1, wherein the notifying step is performed in at least one of the following ways:
(i) graphically displaying a message on a computational component associated with the agent;
(ii) playing a zip tone in the agent's communication device;
(iii) providing an audible voice warning on the agent's communication device; and
(iv) illuminating a warning light visible to the agent.

8. A computer readable medium comprising executable instructions to perform the steps of claim 1.

9. A logic circuit operable to perform the steps of claim 1.

10. A contact center for servicing a contact, comprising:
a contact monitor operable (a) to track a service time required, by a human agent associated with the contact center, to service a customer contact; (b) notify the agent of the tracked service time when the service time at least one of equals and exceeds a selected first threshold and (d) notify the agent and the agent's supervisor when the tracked service time at least one of equals and exceeds a selected second threshold different from the selected first threshold.

11. The contact center of claim 10, wherein the agent is notified that the selected first threshold has been at least one of equaled and exceeded.

12. The contact center of claim 10, wherein selected first threshold is associated with a customer service goal of the contact center.

13. The contact center of claim 10, wherein the contact monitor starts a timer when the contact is directed to the human agent.

14. The contact center of claim 10, wherein the contact monitor starts a timer when the contact is received by a communication device associated with the human agent.

15. The contact center of claim 14, wherein the contact is a non-real-time contact and wherein the contact monitor starts a timer when the contact is displayed graphically on a computational component associated with the agent.

16. The contact center of claim 14, wherein the contact monitor notifies the agent in at least one of the following ways:
(i) graphically displaying a message on a computational component associated with the agent;
(ii) playing a zip tone in the agent's communication device;
(iii) providing an audible voice warning on the agent's communication device; and
(iv) illuminating a warning light visible to the agent.

17. The contact center of claim 14, further comprising:
an input operable to receive the contact; and a selection function operable to direct the contact to the agent for servicing.

18. The method of claim 7, wherein the notifying step is performed by graphically displaying a message on a computational component associated with the agent.

19. The method of claim 7, wherein the notifying step is performed by playing a zip tone in the agent's communication device.

20. The method of claim 7, wherein the notifying step is performed by providing an audible voice warning on the agent's communication device.

21. The method of claim 7, wherein the notifying step is performed by illuminating a warning light visible to the agent.

22. The contact center of claim 16, wherein the contact monitor notifies the agent by playing a zip tone in the agent's communications device.

23. The contact center of claim 16, wherein the contact monitor notifies the agent by providing an audible voice warning on the agent's communications device.

24. The contact center of claim 16, wherein the contact monitor notifies the agent by illuminating a warning light visible to the agent.

25. The contact center of claims 16, wherein the contact monitor notifies the agent by graphically displaying a message on a computational component associated with the agent.

* * * * *

UNITED STATES PATENT AND TRADEMARK OFFICE
CERTIFICATE OF CORRECTION

| | |
|---|---|
| PATENT NO. | : 7,085,367 B1 |
| APPLICATION NO. | : 10/786221 |
| DATED | : August 1, 2006 |
| INVENTOR(S) | : Lang |

Page 1 of 1

It is certified that error appears in the above-identified patent and that said Letters Patent is hereby corrected as shown below:

Column 6, Line 65, remove "(e) notifying the agent of the tracked service time,";

Column 7, Line 1, Claim 1 change "(f)" to --(e)--;

Column 7, Line 42, Claim 10 change "(d)" to --(c)--;

Column 8, Line 46, Claim 25 change "claims" to --claim--;

Signed and Sealed this

Fourteenth Day of August, 2007

JON W. DUDAS
*Director of the United States Patent and Trademark Office*